(12) United States Patent
Le

(10) Patent No.: US 10,704,244 B2
(45) Date of Patent: Jul. 7, 2020

(54) VACUUM OPERATED VALVE

(71) Applicant: FLUIDMASTER, INC., San Juan Capistrano, CA (US)

(72) Inventor: Tuan Le, Fountain Valley, CA (US)

(73) Assignee: FLUIDMASTER, INC., San Juan Capistrano, CA (US)

(*) Notice: Subject to any disclaimer, the term of this patent is extended or adjusted under 35 U.S.C. 154(b) by 0 days.

(21) Appl. No.: 15/558,507

(22) PCT Filed: Mar. 14, 2016

(86) PCT No.: PCT/US2016/022384
§ 371 (c)(1),
(2) Date: Sep. 14, 2017

(87) PCT Pub. No.: WO2016/145456
PCT Pub. Date: Sep. 15, 2016

(65) Prior Publication Data
US 2018/0080206 A1 Mar. 22, 2018

Related U.S. Application Data

(60) Provisional application No. 62/132,400, filed on Mar. 12, 2015.

(51) Int. Cl.
*F16K 31/126* (2006.01)
*F16K 7/12* (2006.01)
(Continued)

(52) U.S. Cl.
CPC ............. *E03D 1/32* (2013.01); *B67D 7/48* (2013.01); *E03D 1/20* (2013.01); *E03D 1/302* (2013.01);
(Continued)

(58) Field of Classification Search
CPC ........ F16K 21/18; F16K 21/20; F16K 31/126; F16K 31/1266; F16K 31/1268;
(Continued)

(56) References Cited

U.S. PATENT DOCUMENTS

| 1,407,993 | A | * | 2/1922 | Earl | ...................... E03B 7/075 |
| | | | | | 137/101 |
| 2,122,949 | A | | 7/1938 | Piquerez | |

(Continued)

FOREIGN PATENT DOCUMENTS

| CN | 1248317 A | 3/2000 |
| CN | 101956416 A | 1/2011 |
| WO | 2016145456 A1 | 9/2016 |

OTHER PUBLICATIONS

U.S. Patent and Trademark Office; PCT International Search Report, Issued in Connection to PCT/US2016/022384; dated Jun. 6, 2016; 2 pages; U.S.

(Continued)

*Primary Examiner* — Hailey K. Do
(74) *Attorney, Agent, or Firm* — Greenberg Traurig, LLP

(57) ABSTRACT

A fill valve with pressure chamber having an open bottom end and a diaphragm at a top end such that falling water level in the toilet tank causes the diaphragm to flex in a first direction, thereby moving a sealing member to an open position, with a venturi in the fill valve keeping the sealing member in the open position until water refilling the tank causes the diaphragm to flex in a second direction, thereby moving the sealing member back to the closed position.

26 Claims, 8 Drawing Sheets

(51) Int. Cl.
*B67D 7/48* (2010.01)
*F16K 31/365* (2006.01)
*E03D 1/32* (2006.01)
*E03D 3/06* (2006.01)
*E03D 5/02* (2006.01)
*F16K 1/12* (2006.01)
*F16K 11/085* (2006.01)
*E03D 1/30* (2006.01)
*E03D 5/094* (2006.01)
*F16K 21/20* (2006.01)
*E03D 1/20* (2006.01)
*E03C 1/02* (2006.01)

(52) U.S. Cl.
CPC .............. *E03D 3/06* (2013.01); *E03D 5/024* (2013.01); *E03D 5/094* (2013.01); *F16K 1/12* (2013.01); *F16K 1/123* (2013.01); *F16K 7/12* (2013.01); *F16K 11/0856* (2013.01); *F16K 21/20* (2013.01); *F16K 31/1266* (2013.01); *F16K 31/1268* (2013.01); *F16K 31/365* (2013.01); *E03C 1/023* (2013.01); *E03C 2001/026* (2013.01)

(58) Field of Classification Search
CPC ...... F16K 31/128; F16K 31/36; F16K 31/365; E03C 2001/026; E03C 1/023; E03D 1/00; E03D 1/302; E03D 1/32; E03D 1/36; E03D 3/06; E03D 3/04; E03D 5/024; E03D 5/092; E03D 5/094; B67D 7/48; F04F 5/04; F04F 5/44; F04F 5/52; F04F 5/54

See application file for complete search history.

(56) References Cited

U.S. PATENT DOCUMENTS

| | | | |
|---|---|---|---|
| 2,875,778 A | 3/1959 | Hair | |
| 3,381,604 A | 5/1968 | Bixby, Jr. | |
| 3,610,271 A | 10/1971 | Jarvis | |
| 4,292,996 A * | 10/1981 | Pataki | F16K 7/17 137/393 |
| 4,471,798 A | 9/1984 | Johannesen | |
| 4,574,826 A * | 3/1986 | Johnson | E03D 1/32 137/2 |
| 4,579,097 A | 4/1986 | Yamamoto et al. | |
| 4,945,944 A * | 8/1990 | Chen | E03D 1/32 137/403 |
| 4,964,421 A * | 10/1990 | Klaus | E03D 1/30 137/460 |
| 5,652,970 A | 8/1997 | Wodeslavsky | |
| 5,661,855 A | 9/1997 | Osmond | |
| 5,720,906 A | 2/1998 | Yamanaka | |
| 5,836,346 A | 11/1998 | Nichols-Roy | |
| 6,035,881 A | 3/2000 | Emmerich et al. | |

OTHER PUBLICATIONS

U.S. Patent and Trademark Office; PCT Written Opinion of the International Searching Authority, Issued in Connection to PCT/US2016/022384; dated Jun. 6, 2016; 6 pages; U.S.
China National Intellectual Property Administration, Search Report for Chinese Application No. 2016800251100, dated Oct. 26, 2018, 2 pages.

* cited by examiner

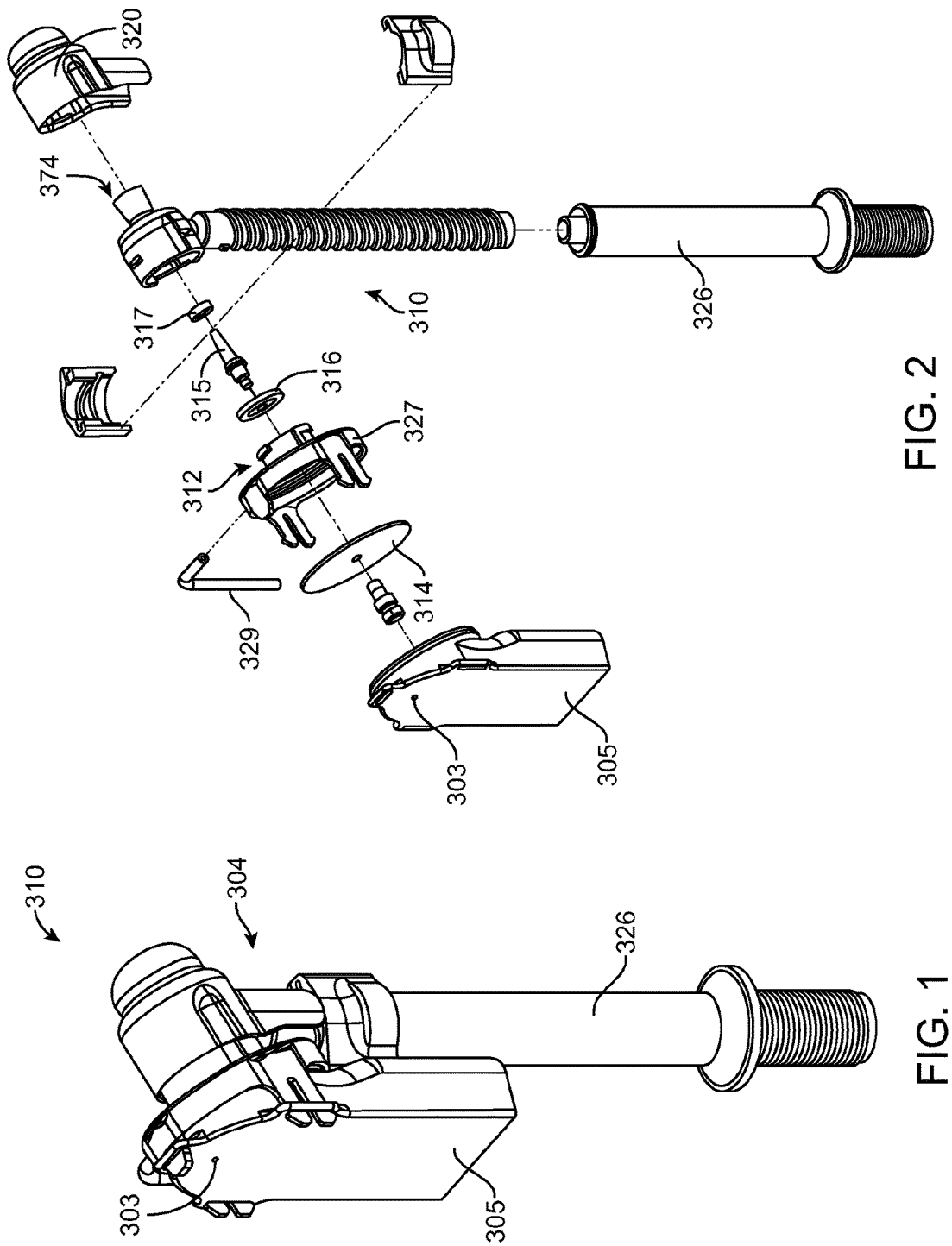

VACUUM OPERATED VALVE

RELATED APPLICATION

This application is the 35 U.S.C. § 371 national application of International Patent Application No. PCT/US2016/022384, filed Mar. 14, 2016, which designated the United States and claimed priority to U.S. Provisional Patent Application No 62/132,400, filed on Mar. 12, 2015, and entitled "Improved Fill Valve," the disclosures of which are incorporated by reference in their entirety.

FIELD

This disclosure relates generally to valves for filling toilet tanks with water.

BACKGROUND

Fill valves in toilets provide water for refilling a toilet tank and for delivering water from the tank into the corresponding bowl during a flush cycle.

Current fill valves typically use floats in a form of an inverted cup or a ball that is disposed in a water tank to sense water level, so that when water level rises, the buoyancy formed on the float makes it rises to activate the valve to off position and when water level drops, the float drops under the gravity effect to turn the valve on. A first problem with such designs is that the float has to be in contact with water in the tank; therefore, debris or mineral deposit from tank water on the float create friction on the float motion, making it vulnerable to failure. An example of this is the traditional piston and ballcock design which has a relatively large float positioned on the end of a relatively long lever arm. One big disadvantage of these ballcock valves are the large amount of space they require to operate in the toilet tank. A long lever arm is required to generate enough force to overcome the hydraulic force through the fill valve in order to close the fill valve. A second problem with this float architecture is the float has to be in vicinity of the valve, in direct contact with the linkage mechanism to turn the valve on and off and float motion strictly obeys the law of gravity with only up and down motions, making this design less flexible for layout.

Another example of a traditional fill valve design is a pilot valve. Pilot valves are designed to improve upon the ballcock valves, wherein the pilot valve uses a smaller float to depressurize or pressurize a control chamber on top of a rubber diaphragm, which is used to seal against a larger opening for better flowrate, so that it can move one way or the other to open or to close the valve. Pilot valves, however, suffer from several noticeable shortcomings. For example, pilot valves are incapable of providing sufficient fast flow rate at substantially low pressures. On the opposite end, pilot valves tend to have higher water hammer at substantially high pressure. Another disadvantage of pilot valves is requiring a higher cracking pressure. The diaphragm of pilot valves is vulnerable to high pressure and/or chemical attacks, reducing its life over the piston type. Furthermore, the pilot valve typically requires tight tolerance parts to work properly. This type of valves with a smaller float still suffers from the same shortcomings by the effects of mineral deposit or requirement for float motion depended on gravity force.

Accordingly, a need exists to provide a fill valve which can be turned on and off without using the float architecture as is now required in traditional designs. It is also desirable to have fast flowrate at low pressures without compromising the life of the sealing member. It is also desired to provide a fill valve with a more compact design without external moving parts as compared to a large, bulky, traditional fill valve assembly. A small fill valve that occupies less space in the toilet tanks is desired. Finally, it is desirable that such a new fill valve would be more flexible for architecture layout to fit in different tank geometries.

SUMMARY

The following simplified summary is provided in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In accordance with the present system, a fill valve with a piston design is provided that only requires minimal forces to turn on and off. This allows the fill valve to be small, making it easy to place in a toilet tank. Moreover, the present fill valve does not require a large ballcock valve float on the end of a lever arm. The present fill valve does not even require a float that moves up and down. Instead, the present fill valve is able to react to water level (and thus turn on or off) without movement of a float. Further advantages of the present fill valve include its higher flowrate at wide range of pressures (as compared to traditional fill valves).

In preferred aspects, the present system provides a fill valve system, comprising: (a) a water supply member; (b) a valve assembly in communication with the water supply member, the valve assembly comprising: (i) a sealing member moveable between an open position during which water flows through the valve assembly and a closed position during which water is prevented from flowing through the valve assembly, (ii) a pressure chamber; (iii) a first diaphragm at a top end of the pressure chamber, wherein the sealing member is mounted to the first diaphragm such that movement of the first diaphragm causes movement of the sealing member; (iv) a second diaphragm that has that has an approximately equal effective sealing are as the sealing member, mounted to the sealing member; (v) a vacuum chamber between the first and second diaphragms; and (vi) a venturi downstream of the moveable sealing member, wherein the sealing member has an air passageway therethrough from the venturi to the vacuum chamber.

In operation, as water is flushed out of the toilet tank (and into the toilet bowl), the water level in the tank starts to drop. This causes a decrease in air pressure in the pressure chamber (which preferably has an open bottom end projecting down into the water). This decrease in air pressure in the pressure chamber causes the first diaphragm to move the sealing member to the open position during which water starts to flow through the valve assembly.

At this time, the hydraulic pressure exerts equal forces on the second diaphragm and the sealing member; therefore, keeping the sealing member in the open position. The water flowing through the valve assembly passes through the venturi which in turn decreases air pressure in the vacuum chamber (between the two diaphragms). There is a vent from the vacuum chamber to atmosphere to allow air to come in the vacuum chamber during the time the valve is turned on to break the vacuum formed inside the vacuum chamber by the venturi. This keeps the sealing member from being closed by the first diaphragm, permitting the tank to refill.

Next, as the water level in the tank rises, the water level will eventually reach the bottom of the pressure chamber. As the water level continues to rise around the outside of the pressure chamber, the air pressure within the pressure chamber will be increased. However, due a small vent on the pressure chamber, this air pressure cannot be built up, thus preventing the first diaphragm from simply pushing the sealing member back into the closed position. When water level in the tank continues to rise, it will eventually reach the bottom of a vent tube or channel extending out of the vacuum chamber, thereby blocking air from going into the vacuum chamber. As a result, the vacuum pressure starts to be built up due to the action of the venturi, thereby exerting force on the first diaphragm to pull the sealing member back into the closed position (such that water no longer flows through the fill valve).

Accordingly, only a minimal amount of force is required to flex the first diaphragm to move the sealing member to the open position, but there is plenty of force generated by vacuum in the vacuum chamber (when the external vent into the vacuum chamber is closed) to flex the first diaphragm to move the sealing member back to the closed position). Therefore, when the fill valve is in its open position, it will tend to remain open (due to the effect of the equilibrium of forces on the sealing member assembly). Conversely, when the fill valve is in its closed position, it will tend to remain closed. Thus, additional force is not required to keep an open valve open, or to keep a closed valve closed. Instead, minimal forces are only required to switch an open valve closed, or to switch a closed valve open. The present system thus provides a novel way to use a venturi to close a valve.

In further preferred aspects, the present invention provides a method of opening and closing a fill valve, comprising: (a) decreasing air pressure in a pressure chamber, thereby deflecting a first diaphragm valve, wherein the first diaphragm valve is in communication with the pressure chamber; (b) moving a sealing member in a valve assembly to an open position by deflecting the first diaphragm valve, wherein the sealing member is supported by the first diaphragm valve, thereby permitting water to flow through the fill valve; (c) directing the water flow through a venturi in communication with the fill valve, thereby decreasing air pressure in a vacuum chamber between the first diaphragm valve and a second diaphragm valve, thereby providing an energy source when needed to close the valve; and then (d) venting the vacuum chamber with an external vent channel when the valve is open and closing the external vent channel into the vacuum chamber when water level rises and covers the bottom of the external vent channel to build up negative pressure in the vacuum chamber, thereby pulling the first diaphragm valve and thereby moving the sealing member to a closed position, thereby preventing water from flowing through the fill valve.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

FIG. 1 is a perspective view of the present vacuum operated fill valve.

FIG. 2 is an exploded perspective view corresponding to FIG. 1.

DETAILED DESCRIPTION

The features of the presently disclosed solution may be economically molded or assembled by using one or more distinct parts and associated components which, may be assembled together for removable or integral application with a known or to-be-designed toilet flushing systems in an economical manner, wherein the features of the present disclosure may form the herein disclosed servicing apparatus regardless of the particular form. Unless defined otherwise, all terms of art, notations and other scientific terms or terminology used herein have the same meaning as is commonly understood by one of ordinary skill in the art to which this disclosure belongs.

In some cases, terms with commonly understood meanings are defined herein for clarity and/or for ready reference, and the inclusion of such definitions herein should not necessarily be construed to represent a substantial difference over what is generally understood in the art. All patents, applications, published applications and other publications referred to herein are incorporated by reference in their entirety. If a definition set forth in this section is contrary to or otherwise inconsistent with a definition set forth in the patents, application, published applications and other publications that are herein incorporated by reference, the definition set forth in this section prevails over the definition that is incorporated herein by reference.

As used herein, "a" or "an" means "at least one" or "one or more." As used herein, the term "user", "subject", "end-user" or the like is not limited to a specific entity or person. For example, the term "user" may refer to a person who uses the systems and methods described herein, and frequently may be a field technician. However, this term is not limited to end users or technicians and thus encompasses a variety of persons who can use the disclosed systems and methods.

The disclosed solution can now be better understood turning to the following detailed description. It is to be expressly understood that the illustrated embodiments are set forth as examples and not by way of limitations on the embodiments as ultimately defined in the claims.

Figure 3:
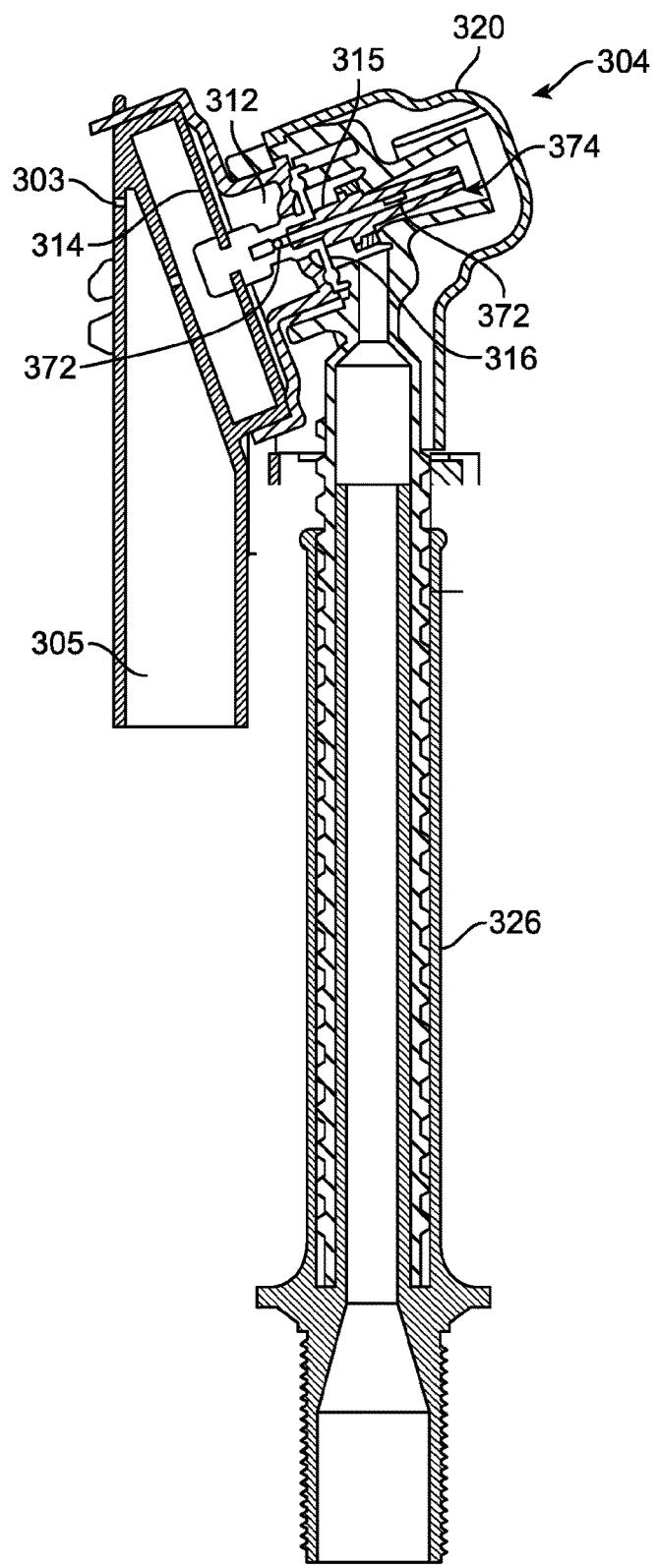
FIG. 3 is a sectional side elevation view of the present vacuum operated fill valve when the fill valve is closed (i.e.: between flushes when the toilet tank is standing filled).
Figure 4:
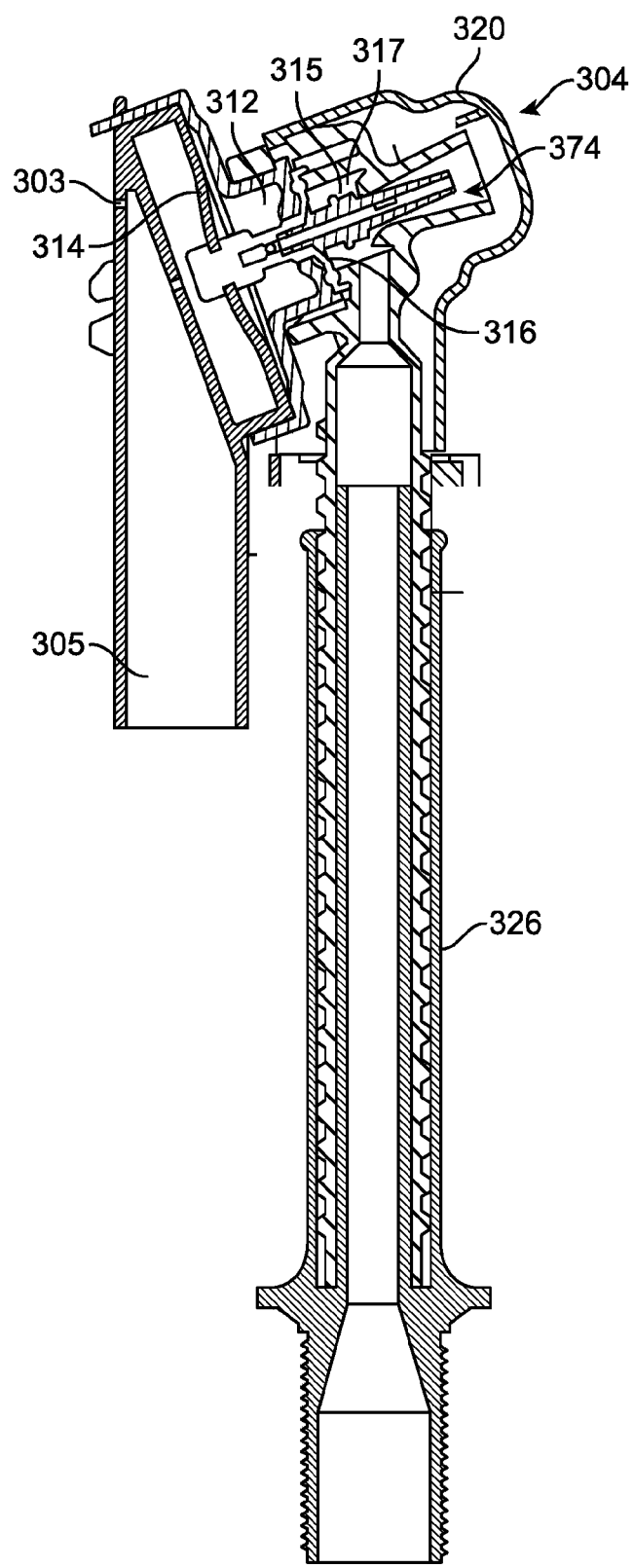
FIG. 4 is a sectional side elevation view of the present vacuum operated fill valve when the fill valve is open (i.e.: during which time the toilet tank is being refilled).
Figure 6:
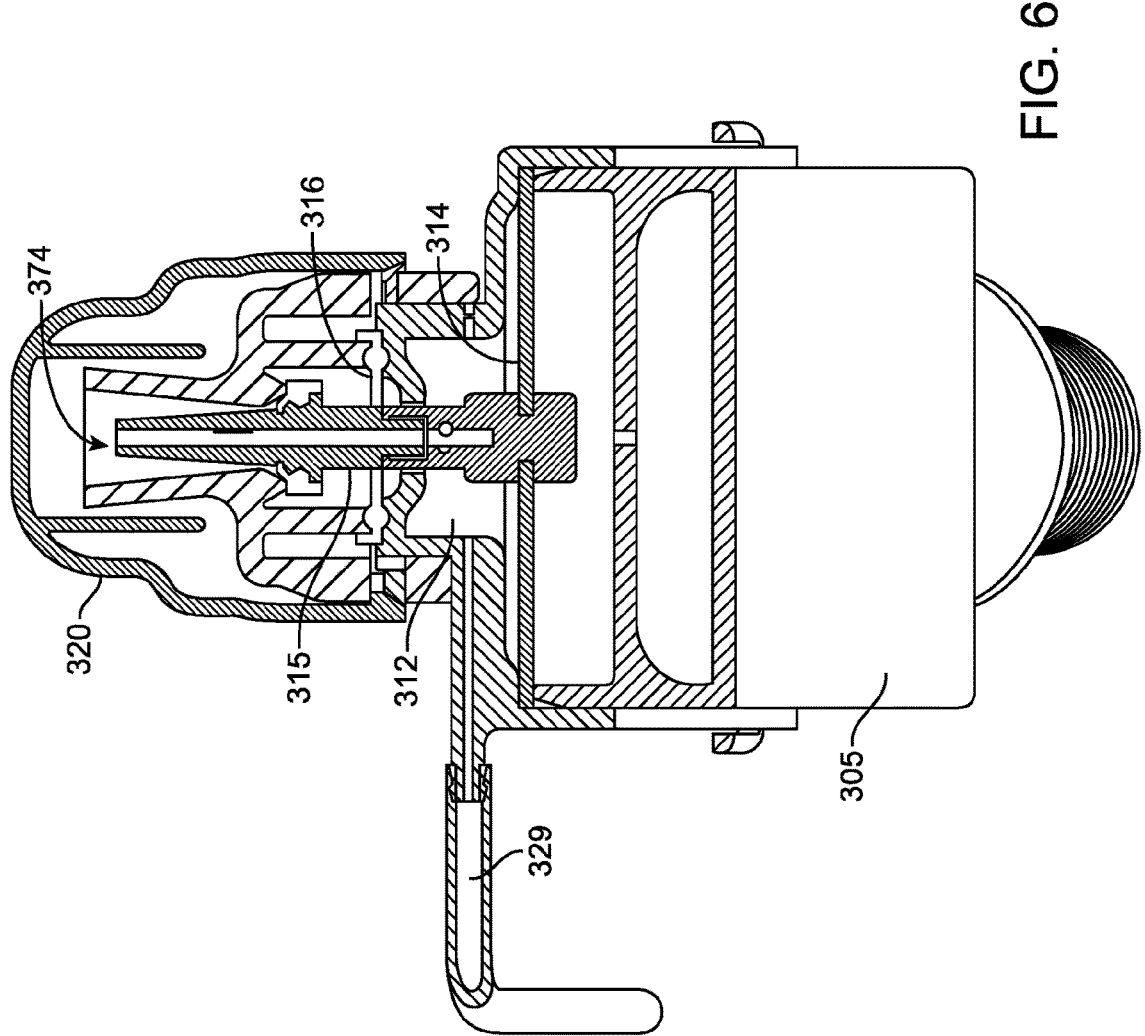
FIG. 6 is a section view of the valve in a closed position.
Figure 5:
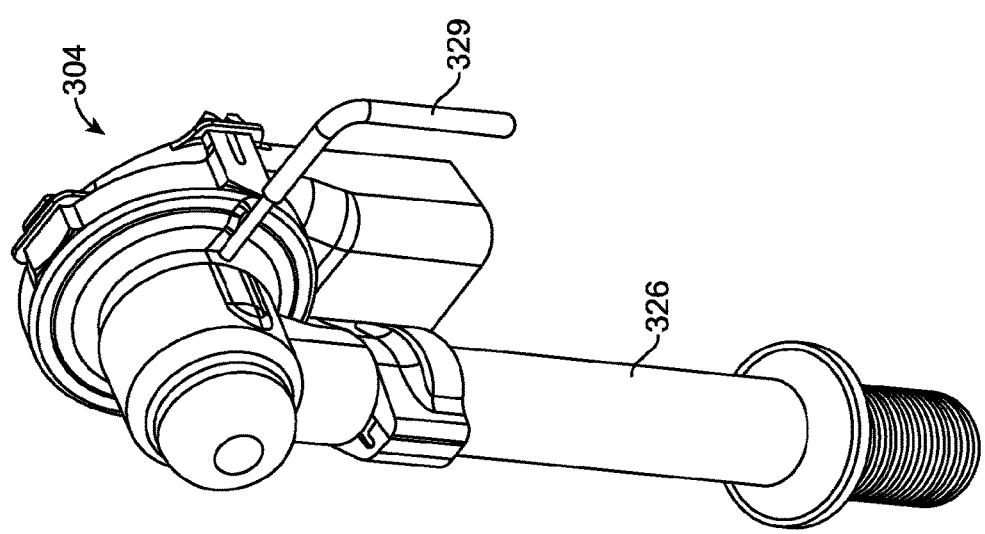
FIG. 5 is an alternate perspective view of the system of FIGS. 1 and 2.
Figure 7:
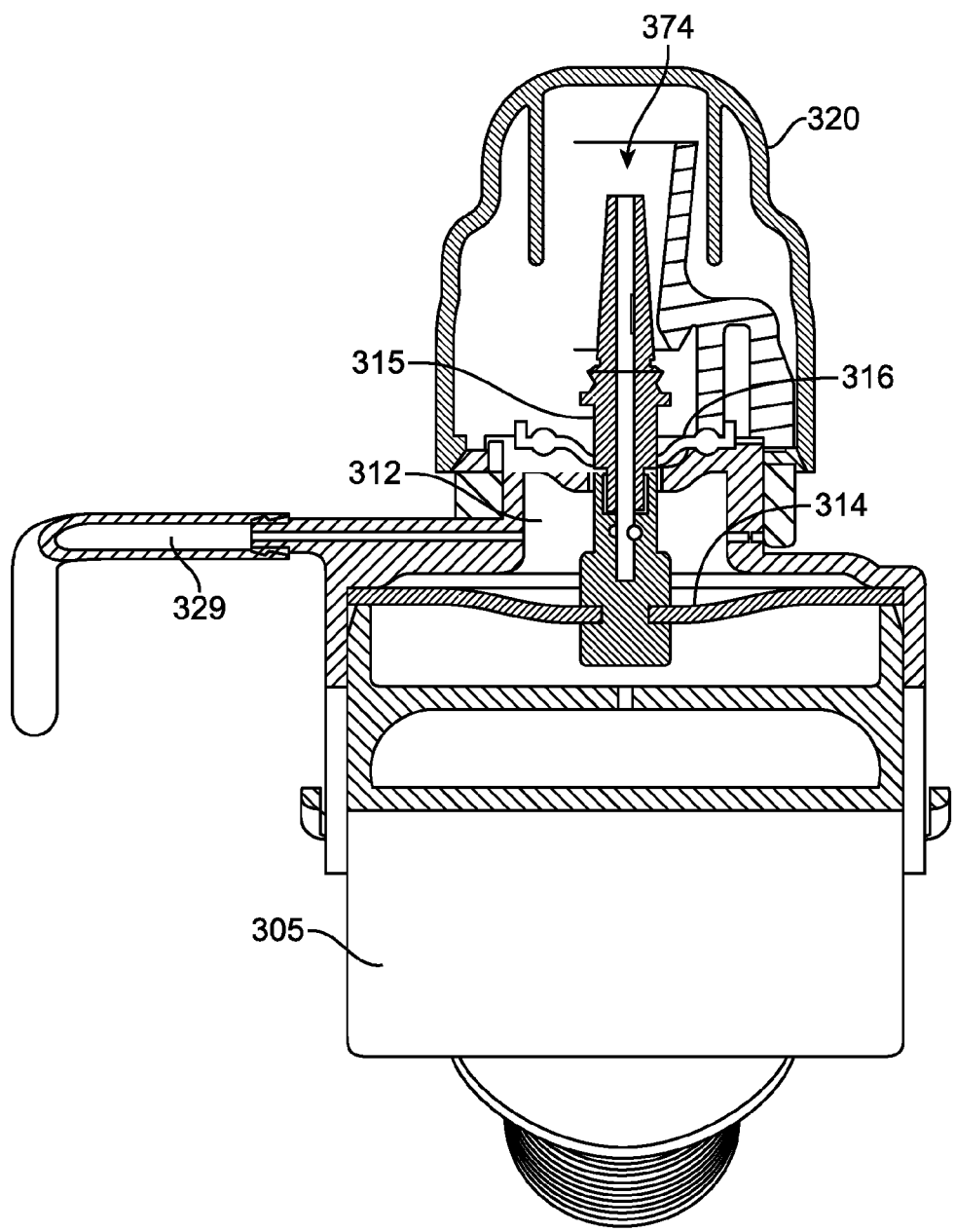
FIG. 7 is a sectional view of the valve in an open position.
Figure 9:
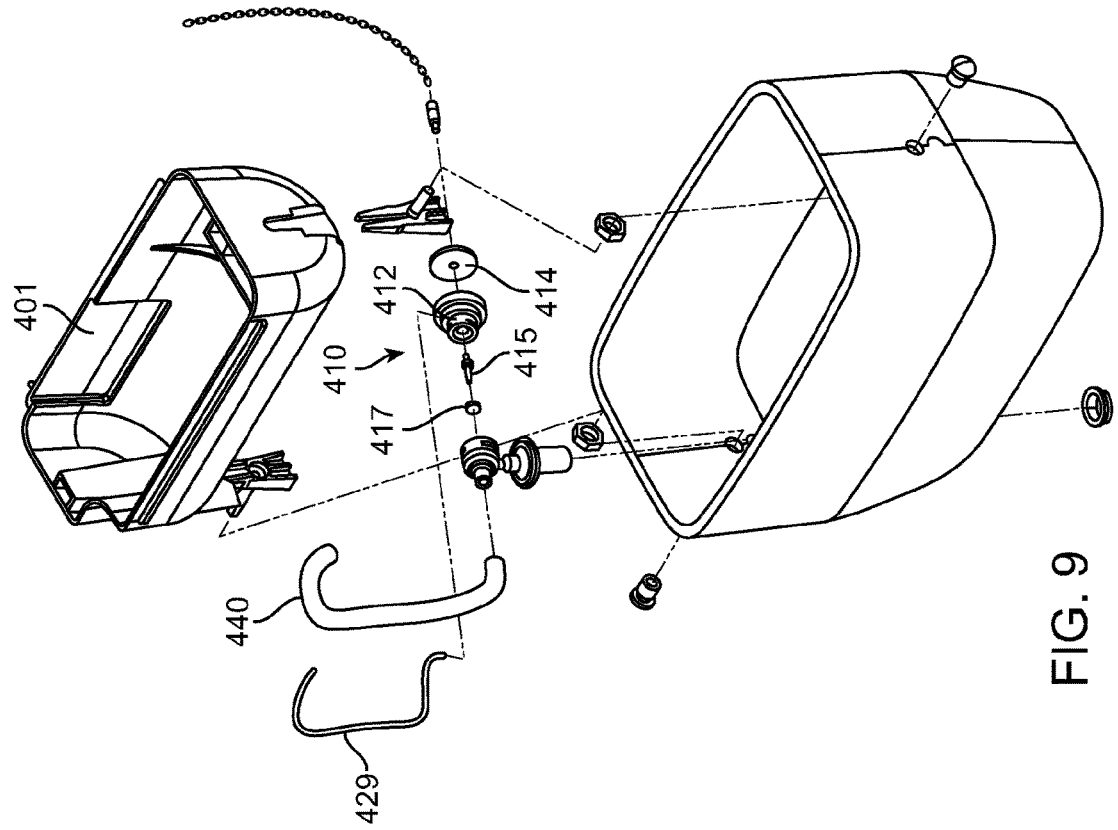
FIG. 9 is an exploded perspective view corresponding to FIG. 8.

FIGS. 1 and 2 illustrate the present fill valve system 310 with FIG. 3 showing it in a closed position, and FIG. 4 showing it in an open position. System 310 comprises a water supply member 326; a valve assembly 304 at a top end of water supply member 326, the valve assembly comprising: a sealing member 315 moveable between an open position during which water flows through the valve assembly and a closed position during which water is prevented from flowing through the valve assembly, a pressure chamber 305; a first diaphragm 314 at a top end of pressure chamber 305, wherein sealing member 315 is mounted to first diaphragm 314 such that movement of first diaphragm 314 causes movement of sealing member 315; a second diaphragm 316 mounted to sealing member 315; a vacuum chamber 312 between the first and second diaphragms 314 and 316; and a venturi 374 formed around an end of the moveable sealing member 315, wherein sealing member 315 has an air passageway therethrough from venturi 374 to vacuum chamber 312.

Water supply member 326 stands in the toilet tank and preferably has a bottom end (not illustrated) that permits it to be fastened to a hole in the bottom of the toilet tank. The building water supply line is then connected to the bottom end of hollow water supply member 326 to refill the toilet tank, as needed.

A cap 320 is also preferably provided over the top end of valve assembly 304, wherein cap 320 is preferably dimensioned to direct water flow down around the outside of hollow water supply member 326 when fill valve 304 is turned on.

FIG. 3 illustrates fill valve 310 in its closed position (between flushes when the surrounding toilet tank is standing full of water and the bottom end of pressure chamber 305 is submerged).

Next, when the toilet is flushed, the system quickly moves to the open position as illustrated in FIG. 4, as follows.

Prior to a flush (FIG. 3), the lower portion of pressure chamber 305 is submerged in tank water. At the time of the flush (FIG. 4), falling water levels in the toilet tank around the pressure chamber 305 will drop the air pressure within pressure chamber 305. The drop in air pressure in pressure chamber 305 will then cause first diaphragm 314 to flex (to the left as seen in FIG. 4), thereby moving sealing member 315 slightly to the left, and opening up a water flow path upwardly from within water supply member 326, and out through venturi 374. Sealing member 315 has a hollowed out internal bore with ventilation holes 372 permitting air flow into or out of vacuum chamber 312. In addition, an external air vent 329 is also provided into vacuum chamber 312. When water flows through venturi 374, it decreases air pressure in vacuum chamber 312 (by drawing air out of vacuum chamber 312 through holes 372 and out the distal end of sealing member 314 within venturi 374). However, at this time, the water level in the tank will have dropped such that the lower end of vent 329 will be above the surface of the water. As a result, air will be drawn through vent 329 and into vacuum chamber 312. Thus, the air pressure on both sides of first diaphragm valve 314 will remain roughly the same. Thus, the valve will remain turned on, refilling the tank. Eventually, however, the water level in the tank will rise to the height such that the bottom end of vent tube 329 will become submerged. External air can no longer enter vacuum chamber 312 through vent 329; however, venturi 374 will continue to pull air out of vacuum chamber 312.

As a result, a decrease in air pressure in vacuum chamber 312 causes the first and second diaphragms 314 and 316 to move towards one another, thereby pushing sealing member 315 back into its closed (FIG. 3) position. Therefore, the action of water passing through fill valve assembly 304 actually causes the fill valve to close (after the toilet tank has been refilled with a sufficient amount of water).

To avoid refilling water prematurely shutting off the valve, pressure chamber 305 has its own small external vent 303. Vent 303 is much smaller than the open bottom end of pressure chamber 305. As a result, a vacuum can be generated that deflects first diaphragm 314 to turn the valve on when the water level in pressure chamber 305 drops quickly during a flush. However, as water slowly rises during refilling, vent 303 allows air to slowly escape from pressure chamber 305 as the bottom of pressure chamber 305 refills with water. This slow refilling of water does not increase the pressure in pressure chamber 305 to such a degree that it would deflect first diaphragm 314 and shut the valve off.

In preferred embodiments, a seal 317 is provided around sealing member 315 at the entrance to venturi 374 to ensure that the flow path is completely shut off when valve assembly 304 is in its closed position.

In other preferred embodiments an upper mount 327 is provided for receiving first diaphragm 314 therein, as shown. Upper mount 327 is positioned at a top end of pressure chamber 305. Together, upper mount 327, pressure chamber 305 and first diaphragm 314 comprise a pressure activation assembly 318.

The present invention also provides a method of opening and closing a fill valve, by: (a) decreasing air pressure in pressure chamber 305, thereby deflecting first diaphragm valve 314; (b) moving sealing member 315 in valve assembly 304 to an open position by deflecting first diaphragm valve 314, wherein sealing member 315 is supported by first diaphragm valve 314, thereby permitting water to flow through fill valve 304; (c) directing the water flow through venturi 374 in fill valve 304, thereby decreasing air pressure in vacuum chamber 312 between first diaphragm valve 314 and second diaphragm valve 316 while drawing air into pressure chamber 312 through external vent 329; and then (d) blocking the airflow into vacuum chamber 312 while continuing to draw air out through the venturi, thereby deflecting first diaphragm valve 314, thereby moving sealing member 315 to a closed position, thereby preventing water from flowing through the fill valve 304.

Preferably, decreasing air pressure in vacuum chamber 312 is accomplished by drawing air through an internal bore in sealing member 315. Decreasing the air pressure in vacuum chamber 312 causes the first and second diaphragms 314 and 316 to deflect towards one another, thereby moving sealing member 315 to its closed position (when air no longer enters vacuum chamber 312 through vent 329).

In existing approaches to fill valve systems, floats are commonly used to detect water level in the toilet tank and in turn cause the fill valve to activate or deactivate. As no prior approach has focused on the issue of reducing the force necessary to open the fill valve, the majority of fill valves are large due to the relatively large size of their floats.

System 310 satisfies these problems and more. Many alterations and modifications may be made by those having ordinary skill in the art without departing from the spirit and scope of the embodiments disclosed and described herein. Therefore, it is understood that the illustrated and described embodiments have been set forth only for the purposes of examples and that they are not to be taken as limiting the embodiments as defined by the following claims. For example, notwithstanding the fact that the elements of a claim are set forth below in a certain combination, it must be expressly understood that the embodiments include other combinations of fewer, more or different elements, which are disclosed above even when not initially claimed in such combinations.

A second embodiment of the invention is seen in FIGS. 8, 9, 10 and 11 as follows.

Figure 8:
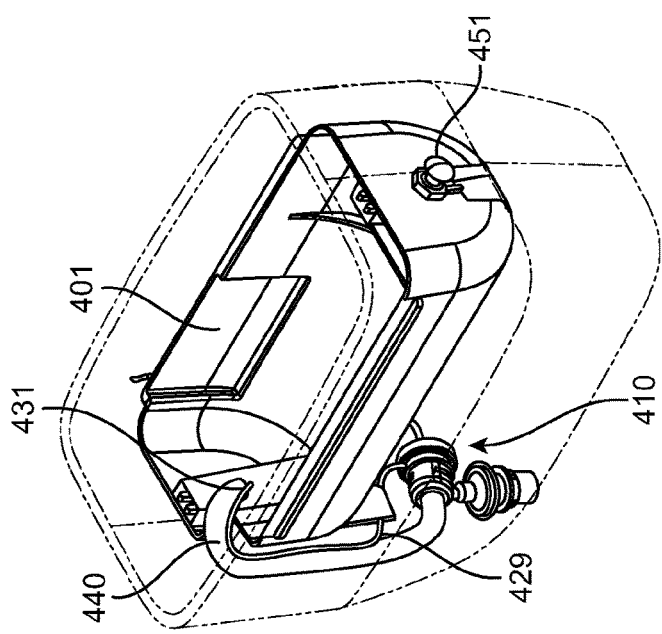
FIG. 8 is an assembled perspective view of a second embodiment of the fill valve system in use in a toilet tank.
Figure 10:
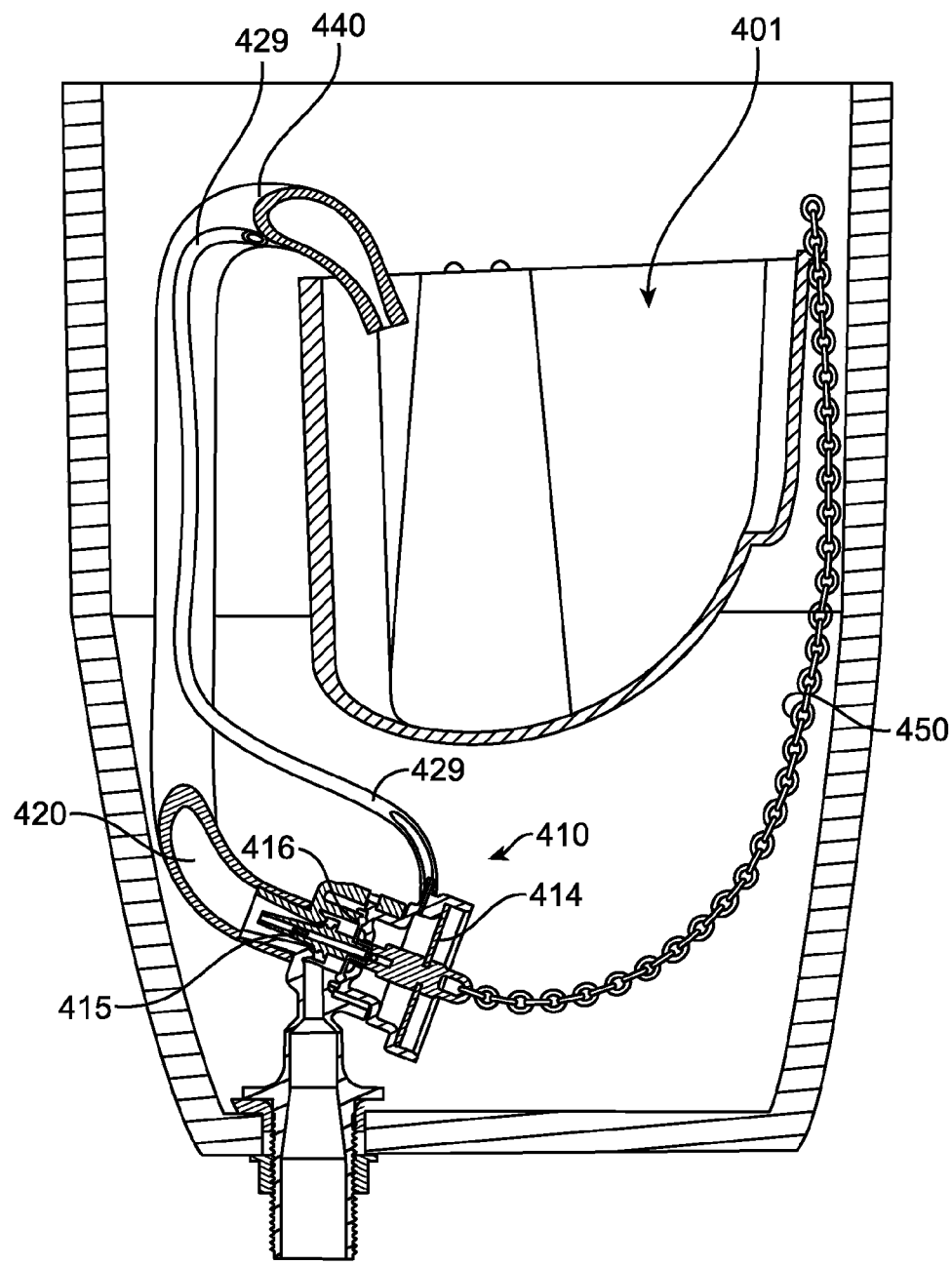
FIG. 10 is a side sectional view of corresponding to FIG. 8.
Figure 11:
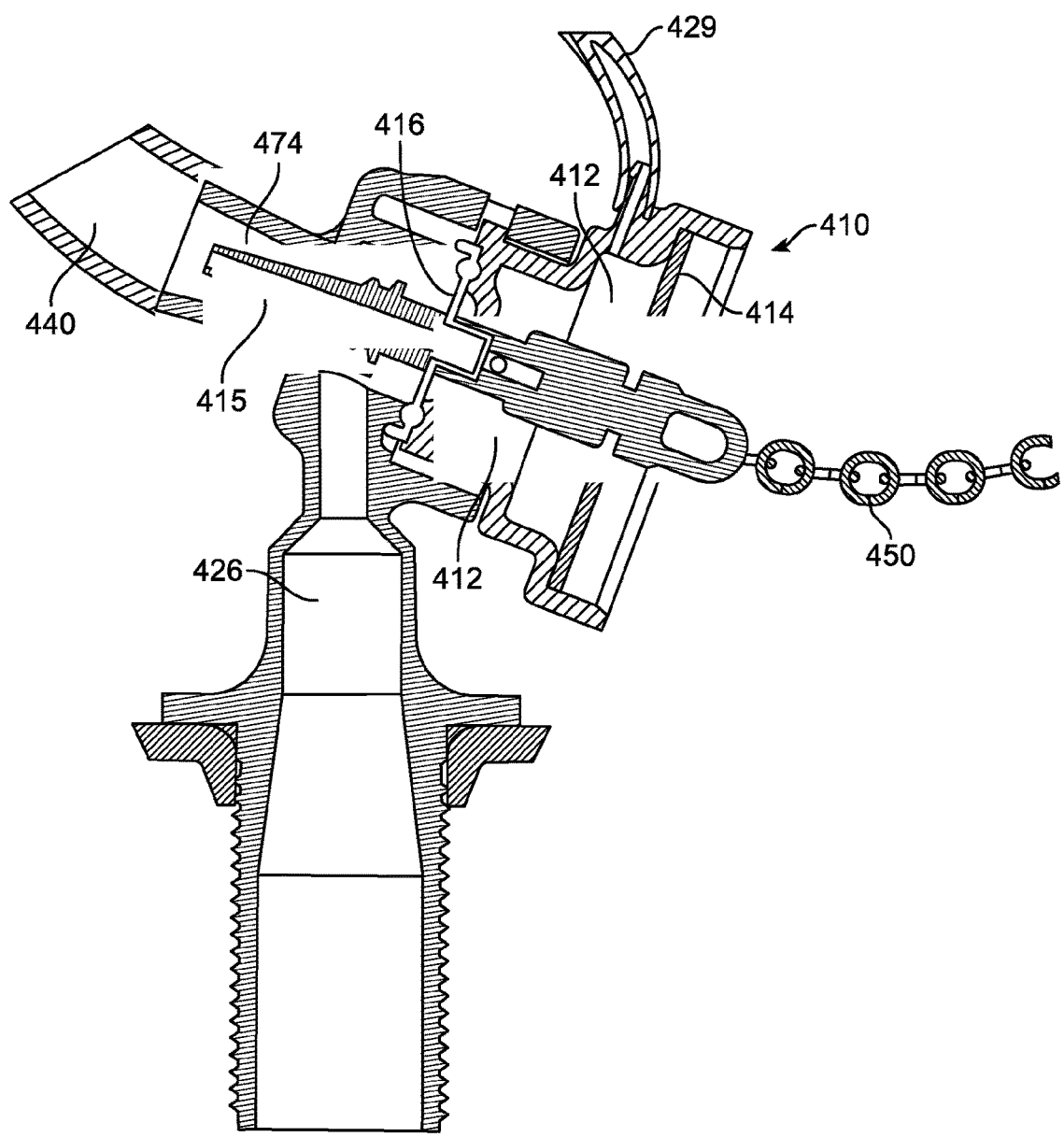
FIG. 11 is a close up sectional view of the fill valve of FIG. 10.

A fill valve 410 is provided. Fill valve 410 is similar in operation to above described fill valve 310, having a first diaphragm 414, a second diaphragm 316, a sealing member 415, and a seal 417. As seen in FIG. 8, a tilting bucket tank 401 is provided. Fill valve 410 fills tank 401 through fill tube 440. A vent tube 429 is connected to vacuum chamber 412. When the water in tilt tank 401 has been emptied, the top end 431 of vent tube 429 will be positioned above the water surface. Eventually, as tank 401 is refilled, then the top end 431 of vent tube 429 will once again become submerged in tank water. At this time, air will stop flowing into vacuum chamber 412. As a result, the effect of venturi 474 will decrease the air pressure in vacuum chamber 412, thereby deflecting first diaphragm 414 (to the left in FIG. 11), causing it to move sealing member 415 and close the fill valve, shutting off refilling of the tank. As can be seen in FIG. 10, a chain 450 may be connected to sealing member 415 at its lower end and to an upper edge of tank 401 at its upper end. As a result, when tank 401 is emptied (by being tilted around a horizontal axis passing through connector 451), the upper end of chain 450 will be pulled upwards, thereby pulling diaphragm 414 (to the right in FIG. 10) to move sealing member 415 into the open position. Thus, this second embodiment of the invention does not require a pressure chamber (like 305) to open the valve. Rather, this opening of the valve is done by mechanical pulling on chain 450 (by tilting the tank). As a result, the present invention provides a system in which a mechanical force can be used to open a valve, and the valve can be shut simply by cutting off airflow into a pressure chamber linked to a venturi in the fill valve.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what incorporates the essential idea of the embodiments.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A valve system, comprising:
   (a) a water supply member;
   (b) a valve assembly in communication with the water supply member, the valve assembly comprising:
      (i) a sealing member moveable between an open position during which water flows through the valve assembly and a closed position during which water is prevented from flowing through the valve assembly,
      (ii) a pressure chamber;
      (iii) a first diaphragm in the pressure chamber, wherein the sealing member is mounted to the first diaphragm such that movement of the first diaphragm causes movement of the sealing member;
      (iv) a second diaphragm in communication with the sealing member;
      (v) a vacuum chamber between the first and second diaphragms; and
      (vi) a venturi downstream of the moveable sealing member, wherein the sealing member has an air passageway therethrough from the venturi to the vacuum chamber.

2. The system of claim 1, further comprising:
   (c) a cap over the valve assembly, the cap being dimensioned to direct water flow down around the outside of the hollow water supply member.

3. The system of claim 1, wherein water flowing through the venturi decreases air pressure in the vacuum chamber.

4. The system of claim 1, wherein the pressure chamber has an open end and a vent, and the open end is larger than the vent.

5. The system of claim 1, further comprising:
   (c) a seal around the sealing member, the seal being positioned at the entrance of the venturi.

6. The system of claim 1, wherein a decrease in air pressure in the pressure chamber causes the first diaphragm to move the sealing member to the open position during which water flows through the valve assembly.

7. The system of claim 6, wherein the decrease in air pressure in the pressure chamber is caused by a falling water level around the pressure chamber.

8. The system of claim 1, wherein a decrease in air pressure in the vacuum chamber causes the first diaphragm to move the sealing member to the closed position during which water does not flow through the valve assembly.

9. The system of claim 8, wherein the decrease in air pressure in the vacuum chamber is caused by water passing through the venturi, thereby drawing air out of the vacuum chamber as a rising water level blocks an entrance to a vent channel into the vacuum chamber.

10. The system of claim 1, wherein the valve assembly further comprises:
    (c) an upper mount receiving the first diaphragm therein.

11. The system of claim 10, wherein the upper mount is positioned at a top end of the pressure chamber.

12. A method of opening and closing a valve, comprising:
    (a) decreasing air pressure in a pressure chamber, thereby deflecting a first diaphragm valve, wherein the first diaphragm valve is in communication with the pressure chamber;
    (b) moving a sealing member in a valve assembly to an open position by deflecting the first diaphragm valve, wherein the sealing member is supported by the first diaphragm valve, thereby permitting water to flow through the valve;
    (c) directing the water flow through a venturi in the valve, thereby drawing air into a vacuum chamber between the first diaphragm valve and a second diaphragm valve, thereby holding the sealing member in the open position; and then
    (d) blocking an air vent into the vacuum chamber, thereby decreasing pressure in the vacuum chamber, thereby deflecting the first diaphragm valve, thereby moving the sealing member to a closed position, thereby preventing water from flowing through the valve.

13. The method of claim 12, wherein the air pressure in the pressure chamber is decreased by lowering the fluid level around the pressure chamber.

14. The method of claim 12, wherein blocking the air vent into the vacuum chamber is accomplished by rising tank water causing an end of the air vent to be submerged in tank water.

15. The method of claim 12, wherein decreasing air pressure in the vacuum chamber between the first diaphragm valve and the second diaphragm valve is accomplished by drawing air through an internal bore in the sealing member.

16. The method of claim 15, wherein decreasing the air pressure in the vacuum chamber after blocking the air vent into the vacuum chamber causes the first and second diaphragms to deflect towards one another, thereby moving the sealing member to the closed position.

17. A valve system, comprising:
   (a) a water supply member;
   (b) a valve assembly in communication with the water supply member, the valve assembly comprising:
      (i) a sealing member moveable between an open position during which water flows through the valve assembly and a closed position during which water is prevented from flowing through the valve assembly,
      (ii) a first diaphragm, wherein the sealing member is mounted to the first diaphragm such that movement of the first diaphragm causes movement of the sealing member;
      (iv) a second diaphragm in communication with the sealing member;
      (v) a vacuum chamber between the first and second diaphragms; and
      (vi) a venturi around an end of the sealing member, wherein the sealing member has an air passageway therethrough from the venturi to the vacuum chamber.

18. The system of claim 17, wherein the first diaphragm is moved by an action of an operator on the sealing member to unseat the first diaphragm and start water flow through the venturi.

19. The system of claim 18, where the action of the operator that unseats the first diaphragm comprises tilting a bucket tank.

20. The system of claim 18, wherein a decrease in air pressure in the vacuum chamber causes the first diaphragm to move the sealing member to the closed position during which water does not flow through the valve assembly.

21. The system of claim 20, wherein the decrease in air pressure in the vacuum chamber is caused by water passing through the venturi, thereby drawing air out of the vacuum chamber as a rising water level blocks an entrance into a vent channel into the vacuum chamber.

22. The system of claim 21, wherein the rising water level blocking the entrance into the vent channel in the vacuum chamber comprises water refilling the bucket tank, wherein an entrance to the vent channel is positioned within the bucket tank.

23. A method of using venturi energy to power operation of a valve, comprising:
   (a) deflecting a diaphragm valve to move a sealing member in a valve assembly to an open position, wherein the sealing member is supported by the diaphragm valve and is coupled to a second diaphragm valve, thereby permitting water to flow through the valve;
   (b) directing the water flow through a venturi in the valve, thereby drawing air through a vacuum chamber positioned between the diaphragm valve and the second diaphragm valve, thereby holding the sealing member in the open position; and then
   (c) blocking an air vent into the vacuum chamber and decreasing air pressure in the vacuum chamber by drawing air through an internal bore in the sealing member, thereby
   causing the diaphragm valve and the second diaphragm valve to deflect towards one another, decreasing pressure in the vacuum chamber, and moving the sealing member to a closed position, thereby preventing water from flowing through the valve.

24. The method of claim 23, wherein the diaphragm valve is deflected by pressure dropping in a pressure chamber.

25. The method of claim 23, wherein the diaphragm valve is deflected by mechanical action of a user.

26. The method of claim 23, wherein blocking an air vent into the vacuum chamber comprises submerging an end of a tube in a fluid.

* * * * *